United States Patent Office 3,496,173
Patented Feb. 17, 1970

3,496,173
10-TERTIARYAMINOALKOXYDIBENZO[a,d]CYCLOHEPTADIENE OR SALTS THEREOF
Jean Clement Louis Fouche, Bourg-la-Reine, France, assignor to Rhone-Poulenc S.A., Paris, France, a French body corporate
No Drawing. Continuation of application Ser. No. 458,428, May 24, 1965. This application Apr. 4, 1968, Ser. No. 718,955
Claims priority, application France May 29, 1964, 976,433; Mar. 22, 1965, 10,207
Int. Cl. C07d 87/28, 51/64; A61k 27/00
U.S. Cl. 260—247.1                         13 Claims

ABSTRACT OF THE DISCLOSURE

The dibenzo[a,d]cycloheptadienes of the formula:

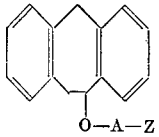

O—A—Z and their acid addition salts and quaternary ammonium derivatives in which A is alkylene of 2 to 5 carbon atoms and Z is dialkylamino or a saturated mononuclear nitrogen containing heterocycle joined to A via the nitrogen atom, are useful as antidepressants, tranquillizers, neuroleptics, anti-Parkinsonians, anti-emetics, anti-serotonins, anti-histaminics and spasmolytics.

---

This application is a "streamlined continuation" of application Ser. No. 458,428 filed May 24, 1965 now abandoned.

This invention relates to dibenzocycloheptadiene derivatives and their preparation.

The invention provides, as new compounds, the dibenzo[a,d]cycloheptadiene derivatives of the formula:

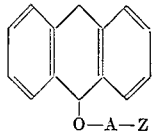

O—A—Z  (I)

and their acid addition salts and quaternary ammonium derivatives, in which A represents a straight or branched, saturated, divalent aliphatic hydrocarbon radical of 2 to 5 carbon atoms, and Z represents a dialkylamino radical in which each alkyl group contains 1 to 18 carbon atoms, or a saturated mononuclear, nitrogen-containing heterocycle joined to A via the nitrogen atom, optionally containing an oxygen, sulphur, or second nitrogen atom, and optionally substituted by one or more alkyl radicals of 1 to 5 carbon atoms, a phenyl or phenylalkyl radical of 7 to 10 carbon atoms, or a said phenyl or phenylalkyl radical substituted by halogen, alkyl or alkoxy of 1 to 5 carbon atoms, nitro, cyano, amino, or trifluoromethyl. Especially valuable compounds are those in which Z is a dialkylamino radical in which each alkyl radical contains 1 to 18, especially 1 to 5, carbon atoms, or a pyrrolidino, piperidino, morpholino, piperazino, 4-alkyl piperazino in which the alkyl group contains 1 to 5 carbon atoms, or 4-(alkylbenzyl)-piperazino radical in which the alkyl group contains 1 to 5 carbon atoms.

According to the invention, the compounds of Formula 1 are prepared by reacting a dibenzo[a,d]cycloheptadiene derivative of the formula:

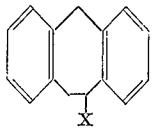

  (II)

with a compound of the formula

Y—A—Z   (III)

wherein one of X and Y, preferably X, is a hydroxy group, and the other represents a reactive ester residue, such as a halogen atom or a sulphuric or sulphonic ester residue (for example a methanesulphonyloxy or toluene-p-sulphonyloxy radical), and A and Z are as previously defined and, if desired, converting a base obtained into an acid addition salt or quaternary ammonium derivative thereof.

The reaction is advantageously carried out in an inert organic solvent such as an aromatic hydrocarbon, preferably at the boiling point of the solvent. Preferably a basic condensing agent such as an alkali-metal derivative, for example sodamide or sodium carbonate, or an excess of the compound of the Formula III is present.

The compounds of the Formula I may optionally be purified by physical methods (such as distillation, crystallisation or chromatography) or by chemical methods (such as formation of salts, crystallisation of the latter, followed by decomposition with alkali). In the latter operation, the nature of the anion of the salt is immaterial, the only condition being that the salt should be well-defined and readily crystallisable.

The compounds of Formula I may be converted into their acid addition salts and quaternary ammonium derivatives. The acid addition salts may be obtained by the action of acids on the new compounds in appropriate solvents, for example, organic solvents, e.g. alcohols, ethers, ketones or chlorinated solvents. The salt formed precipitates after optional concentration of its solution and is separated by filtration or decantation. The quaternary ammonium derivatives may be obtained by the action of the new compounds on reactive esters, optionally in an organic solvent, at room temperature or more rapidly with moderate heating.

The compounds of Formula I, as the bases or as their acid addition salts and quaternary ammonium derivatives, have interesting pharmacodynamic properties. They are very active, more particularly on the central nervous system, as anti-depressants, tranquillisers, neuroleptics, anti-Parkinsonian agents, anti-emetics and anti-serotonins. They also have good anti-histaminic and spasmolytic activity.

For therapeutic purposes, the new compounds may be employed either as the bases or in the form of non-toxic acid addition salts or quaternary ammonium salts, i.e. salts and derivatives containing anions which are relatively innocuous to the animal organism in therapeutic doses of the salts or derivatives, so that the beneficial physiological properties of the base are not vitiated by side-effects ascribable to the anions. Suitable pharmaceutically acceptable acid addition salts include salts with mineral acids (such as hydrochlorides, or other hydrohalides, sulphates, nitrates or phosphates) or with organic acids (such as acetates, propionates, succinates, benzoates, fumarates, maleates, citrates, tartrates, theophyllinates, theophyllineacetates, salicylates, phenolphthalinates, oxalates, methanesulphonates, ethanedisulphonates, or methylene-bis-β-hydroxynaphthoates). Suitable pharmaceutically acceptable quaternary ammonium derivatives include derivatives obtained from esters of mineral or organic acids, such as the derivatives obtained by reaction with methyl, ethyl, allyl or benzyl chloride, bromide or iodide, or with ethyl or methyl sulphate, benzenesulphonate or toluene-p-sulphonate.

The following examples illustrate the invention.

EXAMPLE 1

To a suspension of 2.46 g. of crystallised sodamide (95% pure) in 100 cc. of anhydrous toluene is added a solution of 12.6 g. of 10-hydroxydibenzo[a,d]cycloheptadiene in 170 cc. of anhydrous toluene. 30.6 cc. of a solution of 1-chloro-2-dimethylamino-ethane in toluene (containing 2.16 mol. of product per litre of solution) are then added. The reaction mixture is stirred for one hour at room temperature and then for 90 minutes under reflux. After cooling to 25° C., the reaction mixture is treated with 250 cc. of distilled water and 500 cc. of diethyl ether. The organic solution is decanted, washed three times with a total of 300 cc. of distilled water, and then twice extracted with a total of 300 cc. of an aqueous 2 N acetic acid solution.

The combined acid extracts are made alkaline with 37 cc. of sodium hydroxide solution (d.=1.33), and then extracted four times with a total of 500 cc. of diethyl ether. The combined ethereal solutions are dried over anhydrous potassium carbonate and evaporated. The oily residue obtained (11.3 g.) is dissolved in 15 cc. of ethyl acetate, and the solution obtained is poured into a boiling solution of 4.65 g. of maleic acid in 32 cc. of ethyl acetate. After cooling at 0° C. for two hours, the crystals which have appeared are separated, washed with 10 cc. of ethyl acetate and dried under reduced pressure. 15.0 g. of 10-dimethylamino-ethoxydibenzo[a,d]cycloheptadiene maleate, M.P. 131–132° C., are obtained.

The initial 10-hydroxydibenzo[a,d]cycloheptadiene was prepared in accordance with the procedure of F. J. Villani et al., J. Med. Pharm. Chem. 5, 373 (1962).

EXAMPLE 2

To a suspension of 1.23 g. of sodamide (95% pure) in 50 cc. of anhydrous toluene is added a solution of 6.3 g. of 10-hydroxydibenzo[a,d]cycloheptadiene in 85 cc. of anhydrous toluene. 16.5 cc. of a solution of 1-chloro-2-diethylaminoethane in toluene (containing 2 mol. of haloamine per litre of solution) are then added. The reaction mixture is stirred for one hour at room temperature and then for 90 minutes under reflux. After cooling, 50 cc. of water and 100 cc. of diethyl ether are added. The organic layer is separated and washed 15 times with a total of 800 cc. of distilled water. The base is twice extracted with a total of 150 cc. of an aqueous 2 N acetic acid solution.

The combined acid extracts are made alkaline with 40 cc. of 10 N sodium hydroxide solution and then extracted 4 times with a total of 150 cc. of diethyl ether. The ether layer is dried over anhydrous sodium sulphate, filtered and evaporated. The oily residue obtained (6.7 g.) is dissolved in 15 cc. of acetone. This solution is poured into a boiling solution of 2.8 g. of oxalic acid in 15 cc. of acetone. After cooling at 0° C. for 6 hours, the crystals formed are separated, washed with 15 cc. of acetone, and dried at 60° C. under 2 mm. Hg. 7.3 g. of the acid oxalate of 10-diethylaminoethoxydibenzo[a,d]-cycloheptadiene, M.P. 120° C., are thus obtained.

EXAMPLE 3

To a suspension of 1.6 g. of sodamide (95% pure) in 80 cc. of anhydrous toluene is added a solution of 8.4 g. of 10-hydroxydibenzo[a,d]cycloheptadiene in 100 cc. of anhydrous toluene. 8.8. g. of 1-chloro-2-diisoamylaminoethane are then added. The reaction mixture is stirred for 1 hour at room temperature and then for 90 minutes under reflux. After cooling, 100 cc. of water and 100 cc. of diethyl ether are added. The organic layer is decanted and washed 7 times with a total of 700 cc. of distilled water, dried over sodium sulphate, filtered and evaporated. 15.2 g. of an oil are obtained which are dissolved in 300 cc. of cyclohexane and chromatographed through a column 3.8 cm. in diameter and 34 cm. high containing 300 g. of alumina. The product is eluted with 300 cc. of cyclohexane and then with a mixture of 35 cc. of benzene and 315 cc. of cyclohexane. By concentration of the eluate 9.4 g. of a base are obtained, which is dissolved at elevated temperature in 50 cc. of isopropanol. A hot solution of 3.6 g. of oxalic acid in 30 cc. of isopropanol is added thereto. After cooling at 0° C. for 6 hours, the crystals formed are separated, washed with 30 cc. of isopropanol, and dried under 2 mm. Hg at 60° C. 9.5 g. of the acid oxalate of 10-diisoamylaminoethoxy-dibenzo[a,d]cycloheptadiene, M.P. 140° C., are thus obtained.

EXAMPLE 4

By proceeding as in Example 3, starting with 4.2 g. of 10-hydroxydibenzo[a,d]cycloheptadiene and 8.3 g. of 1-chloro-2-dilaurylaminoethane, 5 g. of the acid oxalate of 10 - dilaurylaminoethoxydibenzo[a,d]cycloheptadiene, M.P. 110—112° C., are obtained.

EXAMPLE 5

To a suspension of 1 g. of sodamide (95% pure) in 40 cc. of anhydrous toluene, is added a solution of 5.25 g. of 10-hydroxydibenzo[a,d]cycloheptadiene in 50 cc. of anhydrous toluene. 41 cc. of a 1-chloro-2-pyrrolidinoethane solution in toluene (containing 0.66 mol. of product per litre of solution) are then added. The reaction mixture is stirred for 1 hour at room temperature and then for 90 minutes under reflux. After cooling, 100 cc. of water and 100 cc. of diethyl ether are added. The organic layer is decanted and washed 25 times with a total of 2500 cc. of distilled water. The base is extracted 3 times with a total of 100 cc. of an aqueous N methane-sulphonic acid solution. The combined acid solutions are made alkaline with 15 cc. of sodium hydroxide solution (d.=1.33) and then extracted 3 times with a total of 150 cc. of diethyl ether. The combined ethereal extracts are dried over sodium sulphate, filtered and evaporated. The oily residue obtained (6.2 g.) is dissolved in 12 cc. of ethanol, and a hot solution of 2.5 g. of fumaric acid in 43 cc. of ethanol is added thereto. After cooling to 0° C., the crystals are separated, washed with 10 cc. of ethanol, and dried under 2 mm. Hg at 60° C. 6.5 g. of the acid fumarate of 10-pyrrolidinoethoxydibenzo[a,d]cycloheptadiene, M.P. 147–149° C., are obtained.

EXAMPLE 6

Proceeding as in Example 5, starting with 6.3 g. of 10 - hydroxydibenzo[a,d]cycloheptadiene and 5.2 g. of 1-chloro-2-piperidinoethane, 8 g. of the acid fumarate of 10 - piperidinoethoxydibenzo[a,d]cycloheptadiene, M.P. 172–173° C., are obtained.

EXAMPLE 7

Proceeding as in Example 5, starting with 6.3 g. of 10 - hydroxydibenzo[a,d]cycloheptadiene and 5.1 g. of 1-chloro-2-morpholinoethane, 8.1 g. of the acid fumarate of 10 - morpholinoethoxydibenzo[a,d]cycloheptadiene, M.P. 136° C., are obtained.

EXAMPLE 8

Proceeding as in Example 5, starting wiht 6.1 g. of 10-hydroxydibenzo[a,d]cycloheptadiene and 4.8 g. of 1-(2-chloroethyl)-4-methylpiperazine, 13.5 g. of the di (acid fumarate) of 10-(4-methylpiperazinoethoxy)diben-zo[a,d]cycloheptadiene, M.P. 205–206° C., are obtained.

EXAMPLE 9

Proceeding as in Example 5, starting with 6.3 g. of 10-hydroxydibenzo[a,d]cycloheptadiene and 8.4 g. of 1-(2-chloroethyl)-4-(2-methylbenzyl)piperazine, 11.5 g. of crude 10-[4-(2-methylbenzyl)piperazinoethoxy]dibenzo[a,d]cycloheptadiene are obtained which are dissolved in 75 cc. of ethanol. A hot solution of 6.2 g. of maleic acid in 50 cc. of ethanol is added. After cooling to 0° C. the crystals are filtered off and washed 3 times with a total of 100 cc. of ethanol. 14.6 g. of the di(acid maleate) of 10-[4-(2-methylbenzyl)piperazinoethoxy]dibenzo[a,d]cycloheptadiene, M.P. 168° C., are obtained.

EXAMPLE 10

Proceeding as in Example 9, starting with 12.6 g. of 10-hydroxydibenzo[a,d]cycloheptadiene and 16.8 g. of 1-(2-chloroethyl)-4-(3-methylbenzyl)piperazine, 14.7 g. of crude base are obtained, which are purified by dissolution in 300 c. of benzene and 60 cc. of cyclohexane and chromatography through a column of 300 g. of alumina (diameter 3.8 cm., height 43 cm.).

The product is eluted with 1200 cc. of benzene. After evaporation of the solvent, 9.2 g. of residue are obtained, which is dissolved in 30 cc. of ethanol. A hot solution of 6.2 g. of maleic acid in 60 cc. of ethanol is added and the mixture is cooled to 0° C., and filtered, and the residue washed 4 times with a total of 40 cc. of ethanol. 13.7 g. of the di(acid maleate) of 10-[4-(3-methylbenzyl)piperazinoethoxy]dibenzo[a,d]cycloheptadiene, M.P. 192° C., are obtained.

EXAMPLE 11

Proceeding as in Example 5, starting with 6.3 g. of 10-hydroxydibenzo[a,d]cycloheptadiene and 4.4 g. of 1-chloro-3-dimethylaminopropane, 6.8 g. of the acid fumarate of 10-(3-dimethylaminopropoxy)-dibenzo[a,d]cycloheptadiene, M.P. 135–136° C., are obtained.

EXAMPLE 12

Proceeding as in Example 5, starting with 6.3 g. of 10-hydroxydibenzo[a,d]cycloheptadiene and 5.2 g. of 1-chloro-3-pyrrolidinopropane, 7.9 g. of crude base are obtained which are dissolved in 35 cc. of isopropanol. A hot solution of 4 g. of oxalic acid in 35 cc. of isopropanol is then added. After cooling to 0° C., the crystals formed are filtered off, washed with 15 cc. of isopropanol and dried under 2 mm. Hg at 70° C. 9.4 g. of the acid oxalate of 10-(3-pyrrolidinopropoxy)dibenzo[a,d]cycloheptadiene, M.P. 170° C., are obtained.

EXAMPLE 13

Proceeding as in Example 5, starting with 8.4 g. of 10-hydroxydibenzo[a,d]cycloheptadiene and 8 g. of 1-chloro-3-(4-methylpiperazino)propane, 17 g. of the di(acid fumarate) of 10-[3-(4-methylpiperazino)propoxy]dibenzo[a,d]cycloheptadiene, M.P. 200° C., are obtained.

EXAMPLE 14

Proceeding as in Example 5, starting with 8.4 g. of 10-hydroxydibenzo[a,d]cycloheptadiene and 6.3 g. of 1-chloro-2-methyl-3-dimethylaminopropane, 11.2 g. of crude base are obtained. This crude base is dissolved in 50 cc. of isopropanol and a hot solution of 5.5 g. of oxalic acid in 50 cc. of isopropanol is added. After cooling to 0° C., the product is filtered off, washed 4 times with a total of 80 cc. of isopropanol, and dried under 2 mm. Hg at 70° C., 13.6 g. of the acid oxalate of 10-(3-dimethylamino-2-methylpropoxy)dibenzo[a,d]cycloheptadiene, M.P. 136° C., are obtained.

The invention includes within its scope pharmaceutical compositions comprising one or more of the compounds of Formula I or non-toxic acid addition salts or quaternary ammonium derivatives thereof, in association with a pharmaceutically acceptable carrier or coating, more especially such compositions suitable for oral, rectal or parenteral administration.

Solid compositions for oral administration include tablets, pills, powders and granules. In these compositions, the active compound is mixed with one or more inert diluents, such as sucrose, lactose or starch. These compositions may also comprise, as is normal practice, substances other than diluents, for example lubricants, such as magnesium stearate.

Liquid compositions for oral administration include pharmaceutically acceptable emulsions, solutions, suspensions, syrups and elixirs containing inert diluents commonly used in the art such as water or liquid paraffin. Besides inert diluents, these compositions may also comprise adjuvants, for example wetting and suspending agents, and sweetening, flavouring, perfuming, and preserving agents.

The compositions of the invention for oral administration also include capsules of absorbable material such as gelatin containing the active compound with or without the addition of diluents or excipients.

The compositions of the invention for parenteral administration include sterile aqueous or non-aqueous solutions, suspensions or emulsions. Examples of non-aqueous solvents or suspending media are propylene glycol, polethylene glycol, vegetable oils, more especially olive oil, and injectable organic esters, for example ethyl oleate. These compositions may also contain adjuvants, more especially preserving, wetting, emulsifying, and dispersing agents. They may be sterilised by for example, filtration through a bacteriological filter, by incorporation of sterilising agents, by irradiation or by heating. They may also be prepared in the form of sterile solid compositions which may be dissolved at the time of use in sterile water or any other sterile injectable medium.

Compositions for rectal administration are suppositories which contain, in addition to the active compound, excipients such as cocoa butter or a suppository wax.

The percentage of active ingredient in the compositions of the invention may be varied, it being necessary that it should constitute a proportion such that a suitable dosage shall be obtained in a convenient quantity of the composition. Ordinarily a percentage concentration of 1 to 50% will be used. The dose administered depends upon the desired therapeutic effect, the route of administration, and the duration of the treatment. By oral administration, generally between 10 mg. and 100 mg. of active product per day is administered for an adult.

The following examples illustrate this aspect of the invention.

EXAMPLE 15

Tablets having the following composition:

| | Mg. |
|---|---|
| 10-dimethylaminoethoxydibenzo[a,d]cycloheptadiene, maleate | 7 |
| Starch | 108 |
| Colloidal silica | 32 |
| Magnesium stearate | 3 | are prepared by the usual method.

EXAMPLE 16

Tablets having the following composition are prepared by the usual method.

| | Mg. |
|---|---|
| 10-dimethylaminoethoxydibenzo[a,d]cycloheptadiene, maleate | 35.3 |
| Starch | 81.7 |
| Colloidal silica | 30 |
| Magnesium stearate | 3 |

I claim:
1. A dibenzo[a,d]cycloheptadiene of the formula:

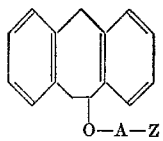

or its acid addition salts or quaternary ammonium salts, in which A represents alkylene of 2 to 5 carbon atoms, and Z represents dialkylamino in which each alkyl radical has 1 to 2 carbon atoms, pyrrolidino, piperidino, morpholino, piperazino, 4-alkyl piperazino in which the alkyl has 1 to 5 carbon atoms, or 4-(alkylbenzyl)-piperazino in which the alkyl has 1 to 5 carbon atoms.

2. A compound according to claim 1 consisting of 10-dimethylaminoethoxy-dibenzo[a,d]cycloheptadiene or an acid addition salt thereof.

3. A compound according to claim 1 consisting of 10-diethylaminoethoxy-dibenzo[a,d]cycloheptadiene or an acid addition salt thereof.

4. A compound according to claim 1 consisting of 10-pyrrolidinoethoxy-dibenzo[a,d]cycloheptadiene or an acid addition salt thereof.

5. A compound according to claim 1 consisting of 10-piperidinoethoxy-dibenzo[a,d]cycloheptadiene or an acid addition salt thereof.

6. A compound according to claim 1 consisting of 10-morpholinoethoxy-dibenzo[a,d]cycloheptadiene or an acid addition salt thereof.

7. A compound according to claim 1 consisting of 10-(4-methylpiperazinoethoxy) - dibenzo[a,d,]cycloheptadiene or an acid addition salt thereof.

8. A compound according to claim 1 consisting of 10-[4 - (2 - methylbenzyl)piperazinoethoxy]dibenzo[a,d]cycloheptadiene or an acid addition salt thereof.

9. A compound according to claim 1 consisting of 10-[4 - (3 - methylbenzyl)piperazinoethoxy]dibenzo[a,d]cycloheptadiene or an acid addition salt thereof.

10. A compound according to claim 1 consisting of 10-[3 - dimethylaminopropoxy]dibenzo[a,d]cycloheptadiene or an acid addition salt thereof.

11. A compound according to claim 1 consisting of 10 - (3 - pyrrolidinopropoxy) - dibenzo[a,d]cycloheptadiene or an acid addition salt thereof.

12. A compound according to claim 1 consisting of 10 - [3 - (methylpiperazino)propoxy] - dibenzo[a,d]cycloheptadiene or an acid addition salt thereof.

13. A compound according to claim 1 consisting of 10 - (3 - dimethylamino - 2 - methylpropoxy) - dibenzo[a,d]cycloheptadiene or an acid addition salt thereof.

References Cited

UNITED STATES PATENTS 3,227,716  1/1966  Harms et al. _____ 260—294.7

ALEX MAZEL, Primary Examiner

J. TOVAR, Assistant Examiner

U.S. Cl. X.R.

260—247.2, 247.7, 256, 268, 293.4, 294, 294.7, 326.3, 326.5, 501.15, 501.17, 567.6, 570.7; 424—248, 250, 267, 274, 316, 329, 330